(12) United States Patent
Sundberg

(10) Patent No.: US 6,563,095 B1
(45) Date of Patent: May 13, 2003

(54) RESISTANCE-HEATING ELEMENT

(75) Inventor: Mats Sundberg, Västerås (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/574,244

(22) Filed: May 19, 2000

(30) Foreign Application Priority Data

May 20, 1999 (SE) .............................................. 9901827

(51) Int. Cl.⁷ ........................ H05B 3/10; H01C 17/00; H01B 1/06
(52) U.S. Cl. ........................ 219/553; 29/610.1; 252/508
(58) Field of Search ................................ 219/543, 544, 219/546, 547, 548, 552, 553; 252/506–509, 512, 513, 514, 515, 516; 29/610.1, 620, 611; 419/19, 46, 47, 56, 57, 58

(56) References Cited

U.S. PATENT DOCUMENTS

| | | | |
|---|---|---|---|
| 1,691,369 A | * 11/1928 | Baker | .......................... 432/237 |
| 2,793,951 A | * 5/1957 | Green | .......................... 419/37 |
| 2,955,145 A | * 10/1960 | Schrewelius | ................ 136/239 |
| 3,002,936 A | * 10/1961 | Allenbach | ................ 252/521.3 |
| 4,323,484 A | 4/1982 | Hattori et al. | |
| 4,354,964 A | * 10/1982 | Hing et al. | .................. 252/512 |
| 4,486,651 A | * 12/1984 | Atsumi et al. | ............... 219/553 |
| 4,528,121 A | 7/1985 | Matsushita et al. | |
| 4,613,455 A | * 9/1986 | Suzuki et al. | ............... 252/516 |
| 5,048,801 A | * 9/1991 | Johnson et al. | ............. 266/256 |
| 5,162,099 A | * 11/1992 | Meyer et al. | .................. 419/25 |
| 5,225,155 A | * 7/1993 | Hampton et al. | ............. 419/56 |
| 5,233,166 A | * 8/1993 | Maeda et al. | ................ 219/552 |
| 5,456,878 A | * 10/1995 | Tadokoro et al. | ............. 419/38 |
| 5,993,731 A | * 11/1999 | Jech et al. | ..................... 419/19 |

FOREIGN PATENT DOCUMENTS

| | | |
|---|---|---|
| GB | 924497 | 7/1959 |
| SE | 210 969 | 2/1967 |

* cited by examiner

*Primary Examiner*—Sang Paik
(74) *Attorney, Agent, or Firm*—Burns, Doane, Swecker & Mathis, LLP

(57) ABSTRACT

An electrical resistance element of a silicide phase according to the formula $Mo(Si_{1-x}Al_x)_2$, which phase forms alumina on the surface of the element. The element is intended to be used in connection with sintering of metal powder. Because of its surprisingly good ability to form an alumina layer on the surface, this material has shown to be very resistant against corrosion at high temperatures over 1500° C. in both reducing and oxidizing atmosphere.

29 Claims, 1 Drawing Sheet

RESISTANCE-HEATING ELEMENT

FIELD OF THE INVENTION

The present invention relates to a new electrical resistance-heating element of the molybdenum silicide type intended for use in connection with sintering of metal powder.

BACKGROUND OF THE INVENTION

Resistance-heating elements of the above-mentioned kind have existed since the 1950's such as the element sold under the trademark Kanthal Super. These elements are usually made of a metal-like phase of $MoSi_2$, alternatively of $Mo_xW_{1-x}Si_2$, in addition to an oxide phase of the aluminum silicate type. Similar types of material can be used in an oxidizing atmosphere at element temperatures up to 1900° C.

What makes this high working temperature possible is, besides the high melting point of the material (over 2000° C.), is the formation of an oxide layer of $SiO_2$ on the material which rapidly makes the basic material passive against accelerated oxidation and thus a long service time for the heating element is possible. This outer layer gives lasting protection in several furnace and heat treating atmospheres, such as air, oxygen, nitrogen/ hydrogen gas, cracked ammonia, and others. Conditions that often limit the use of such materials include high temperatures of the element in conjunction with an inadequate potential for oxygen, or a dew point that is too low. If the critical proportions between the dew point and the temperature of the element is exceeded the $SiO_2$-layer becomes unstable and, after a certain time, does not give any protection to the base material. For instance in hydrogen gas this occurs at an element temperature of 1300° C. when the dew point is lower than about −30° C. To keep the $SiO_2$ layer stable when temperature of the element is 1450° C., a dew point over +20° C. is required, i.e., an atmosphere containing more than 2.3 percent by volume of water. The instability of the $SiO_2$-layer poses a restriction of the usage of the element in certain connections.

An application where such limitations manifest themselves is the sintering of metal powder in order to produce stainless steel. Components of the stainless steel grade AISI316L are produced by pressing of powder, or by injection moulding metal powder. After evaporation of the binding agent at a low temperature, a final sintering in the range of temperature between 1300–1360° C. in reduced atmosphere is often required. The reducing gas can be pure hydrogen gas with a dew point at −40° C. to −60° C., corresponding to about 0.01 and 0.001 percent by volume of water, respectively. The low dew point has to be maintained in order to reduce metal oxides during the sintering process, which results in a material with high density and good mechanical properties. For such an application, a heating element temperature between 1400 and 1550° C. should be required, dependent on the element shape and furnace design. Under such conditions, the $SiO_2$-layer formed on conventional heating elements based on $MoSi_2$ is not stable.

Heating elements which are used today in many furnaces for sintering of metal powder in the temperature range over 1250–1300° C. are mainly manufactured from molybdenum, but some are also made from tungsten. A limitation of this material is, besides its relatively high total cost, is the requirement that furnace elements made from such materials must be kept over 400° C. in an atmosphere deficient in oxygen in order to avoid the detrimental oxidation of the pure molybdenum or tungsten metal. Thus, furnace leakage or other breakdowns can damage such elements.

Alternative materials which exist for electrical resistance heating under these conditions are alloys and intermetallic compounds such as FeCrAl, NiCr and $MoSi_2$ (e.g. Kanthal Super as above). The limitations of $MoSi_2$-material were described above. FeCrAl and NiCr form oxides of $Al_2O_3$ and $Cr_2O_3$, respectively, on the surface of furnace elements made from such materials when under air. In a reducing atmosphere, such as dry hydrogen gas, the range of temperature under use is limited to about 1400° C. for FeCrAl and 1250° C. for NiCr (e.g.-sold under the trademark Nicrothal 80).

In case of NiCr-alloys the $Cr_2O_3$ is not stable above this temperature. In case of FeCrAl the $Al_2O_3$-layer certainly remains stable, but the service time of the material at this temperature is limited by the melting temperature which is close to about 1500° C. Thus, if the FeCrAl should be used for sintering of 316L type material, the requirements for high element temperatures would lead to very limited service times.

It would be desirable to use a material to form such elements that combines the ability to form alumina on the surface with a melting temperature considerable higher than 1500° C., and could be used in either a reducing or an oxidizing. Thus, the disadvantages of the molybdenum elements could be eliminated since the elements do not always have to be used in an atmosphere deficient in oxygen.

SUMMARY OF THE INVENTION

The present invention overcomes the deficiencies of the above-mentioned conventional materials, and others.

In one aspect, the present invention provides an electrical resistance heating element for sintering metal powder, the element made from a material having a composition comprising mainly a silicide phase according to the formula $Mo(Si_{1-x}Al_x)_2$, which phase forms alumina on the surface of the element.

In a further aspect, the present invention provides a method according to sintering a metal powder comprising: heating the metal powder with a heating element made from a material having a composition comprising $Mo(Si_{1-x}Al_x)_2$, wherein x is 0.1 to 0.6.

DETAILED DESCRIPTION OF THE PREFERRED EMBODIMENTS

Figure 1:
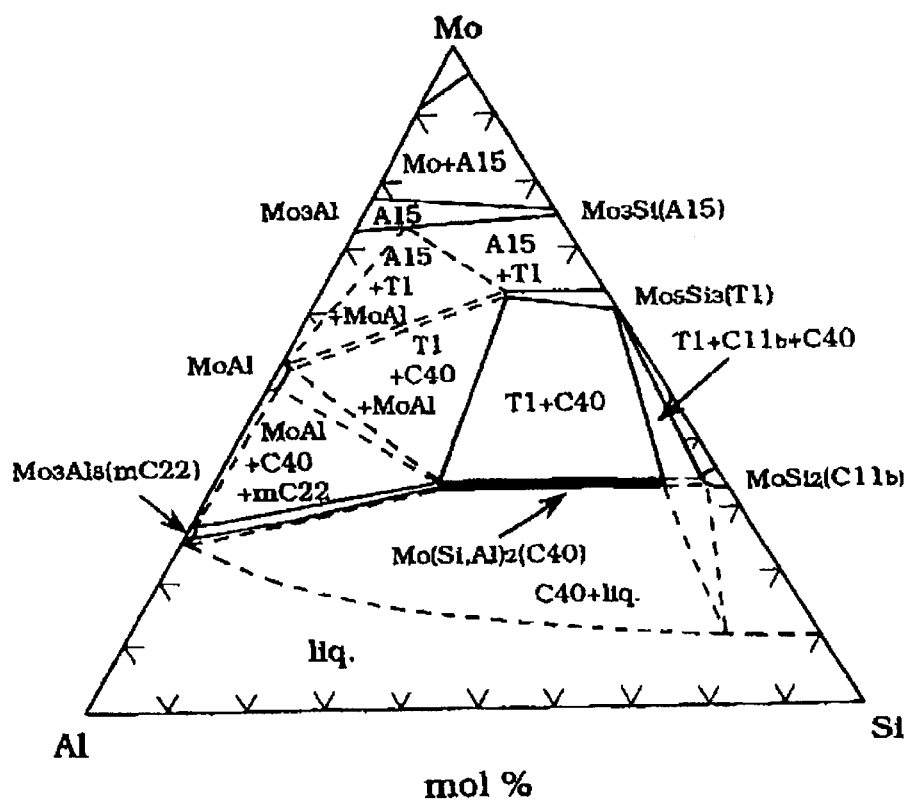
FIG. 1 is a phase diagram for a material of the present invention.

It has surprisingly been shown, that by alloying $MoSi_2$ with Al in a sufficient quantity, a phase of molybdenum alumina silicide, $Mo(Si_{1-x}Al_x)_2$ is obtained, which can be compounded with an alumina phase. Such a material is stable in dry hydrogen gas at high temperatures. This has been demonstrated by a corrosion test in hydrogen gas at 1450° C. The compound material $MoSi_{1.6}Al_{0.4}/Al_2O_3$ does not show any corrosion after 200 hours, and shows an insignificant weight increase of 0.2%, which corresponds to an oxidation of aluminum in the aluminoslilicide into $Al_2O_3$. A comparison with Kanthal Super 1800 (i.e.- $MoSi_2$ and about 20 percent by volume of aluminum silicate) was conducted. The weight of the Kanthal Super 1800 material was reduced about 30% under the same conditions. In this case, in addition to the $SiO_2$-layer, the $MoSi_2$-phase, $Mo_5Si_3$, $Mo_3Si$ and also the aluminum silicate containing binding agent of the Kanthal Super 1800 material were reduced.

It is reasonable to assume that even other compositions can be used to obtain similar results. For instance it has been shown, that $MoSi_{1.75}A_{0.25}/Al_2O_3$ forms $Al_2O_3$ under oxidation in air at 1200° C. At values for x in the range of 0.1–0.6 (inclusive of the limits) the hexagonal, so called C-40-phase of $Mo(Si,Al)_2$, is stable. The present invention even could be applied with those compositions.

The value of x should amount to 0.10–0.60, preferably 0.20–0.55.

It is also beyond all doubt, that at least some of the molybdenum could be substituted by tungsten to form $Mo_{1-y}W_ySi_{1-x}Al_x$, under maintenance of the desirable properties for sintering of metal powder.

Herewith y should amount to a numerical value in the range of 0–0.4, preferably 0.05–0.20. Substitution of Mo with W can be done while maintaining a C11 crystal structure and thereby increasing the service temperature of the heating element made with the composition $Mo_{1-y}W_ySi_2$.

The above can be demonstrated by way of example, in the modification of for instance for heating elements with the trademark Kanthal Super 1900, which like Kanthal Super 1800 forms $SiO_2$ on the surface. A C-40-phase, which is analogous to the C-11 phase, will be formed even at alloying of the aluminum and the substitution of molybdenum with tungsten according to $Mo_{1-y}W_ySi_{1-x}Al_x$. The remaining phases, which can be formed with high x-values in the system Mo—Si—Al are for example aluminides of molybdenum, which appears from the phase diagram of FIG. 1, valid at 1823 K.

Under experimental work in connection with the present invention it was proved suitable that the silicide phase amounts to between 65 and 95 percent by weight of the total weight of the resistance element, preferably between 75 and 85 percent by weight. As mentioned above, the resistance element contains alumina in addition to the silicide phase. The balance can consist of $SiO_2$, suitably between 0 and 1 percent by weight (inclusive of the limits).

The above-described invention could also be used in other sintering applications, where low oxygen potential, alternatively a low dew point, is required. This is sometimes the case with the sintering of tungsten heavy alloy powder, certain types of alloys of titanium and intermetallic compounds, and also of low alloyed steels. For instance the heavy alloy W-Cu have been sintered in hydrogen at 1400° C. with a dew point at −36° C.

The above mentioned formed alumina is expected to be stable up to about 1595° C., which is the eutectic temperature in the system $SiO_2$-$3Al_2O_3$.$2SiO_2$ (mullite). This oxide is expected to have different corrosion properties than the pure alumina. Therefore, the above-described material could constitute a general alternative to the heating element materials of the molybdenum-type.

The principles, preferred embodiments and mode of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A method of sintering a metal powder comprising:
   providing a reducing atmosphere;
   heating the metal powder with a heating element disposed in the reducing atmosphere, the heating element made from a material having a composition comprising $Mo(Si_{1-x}Al_x)_2$, wherein x is 0.1 to 0.6, the material comprising a silicide phase which forms a protective alumina layer on a surface of the element while heating the metal powder in the reducing atmosphere.

2. The method according to claim 1, wherein the powder is heated to a temperature above 1500° C.

3. The method according to claim 2, wherein the reducing atmosphere a comprises hydrogen gas.

4. The method according to claim 1, wherein W is partly substituted for Mo thereby forming a material heating element comprising $Mo_{1-y}W_y(Si_{1-x}Al_x)_2$, wherein y is 0 to 0.40.

5. The method according to claim 4, wherein y is 0.05 to 0.20.

6. The method according to claim 1, wherein x is 0.20 to 0.55.

7. The method according to claim 1, wherein the powder comprises a stainless steel.

8. The method according to claim 1, wherein the material of the heating element further comprises $Al_2O_3$ in an amount of 10 to 20 percent by volume.

9. The method according to claim 8, wherein the material comprises a balance of $SiO_2$.

10. The method according to claim 8, wherein the metal powder comprises an ironbased metal powder.

11. The method according to claim 1, wherein the silicide phase comprises 65 to 95 weight % of the material.

12. The method according to claim 1, wherein the silicide phase comprises 75 to 85 weight % of the material.

13. The method according to claim 1, wherein the metal powder comprises a stainless steel.

14. The method according to claim 1, further comprising providing the reducing atmosphere with a dew point of −40° C. or less.

15. The method according to claim 1, further comprising providing the reducing atmosphere with a dew point of −40° C. to −60° C.

16. A method of using a heating element made from a material having a composition comprising $Mo(Si_{1-x}Al_x)_2$, wherein x is 0.1 to 0.6, the material comprising a silicide phase, the method comprising the steps of:
   providing a reducing atmosphere;
   disposing the heating element in the reducing atmosphere;
   producing heat with the heating element; and
   forming a protective alumina layer on a surface of the heating element.

17. The method according to claim 16, wherein the reducing atmosphere comprises hydrogen gas.

18. The method according to claim 16, wherein W is partly substituted for Mo in the heating element material, providing a composition comprising $Mo_{1-y}W_y(Si_{1-x}Al_x)_2$, wherein y is 0 to 0.40.

19. The method according to claim 18, wherein y is 0.05 to 0.20.

20. The method according to claim 16, wherein x is 0.20 to 0.55.

21. The method according to claim 16, further comprising:
   introducing a metal powder into the reducing atmosphere and heating the metal powder with the heat produced from the heating element.

22. The method according to claim 21, wherein the metal powder comprises an ironbased metal powder.

23. The method according to claim 21, wherein the powder comprises stainless steel.

24. The method according to claim 16, wherein the heating element material comprises 10 to 20 volume % $Al_2O_3$.

25. The method according to claim 24, wherein the material comprises a balance of $SiO_2$.

26. The method according to claim 16, wherein the silicide phase comprises 65 to 95 weight % of the material.

27. The method according to claim 16, wherein the silicide phase comprises 75 to 85 weight % of the material.

28. The method according to claim 16, further comprising providing the reducing atmosphere with a dew point of −40° C. or less.

29. The method according to claim 16, further comprising providing the reducing atmosphere with a dew point of −40° C. to −60° C.

* * * * *